US009193304B2

(12) United States Patent
Svaldi et al.

(10) Patent No.: US 9,193,304 B2
(45) Date of Patent: Nov. 24, 2015

(54) SPORTS EQUIPMENT VEHICLE RACK

(71) Applicant: Outdoor Girl LLC, Arvada, CO (US)

(72) Inventors: Alicia Svaldi, Arvada, CO (US); Heidi Hostetter, Longmont, CO (US); Thomas Thorson, Colorado Springs, CO (US); Thomas Svaldi, Arvada, CO (US); Dennis Svaldi, Arvada, CO (US); Katheryn Svaldi, Arvada, CO (US)

(73) Assignee: Outdoor Girl LLC, Arvada, CO (US)

( * ) Notice: Subject to any disclaimer, the term of this patent is extended or adjusted under 35 U.S.C. 154(b) by 31 days.

(21) Appl. No.: 14/056,471

(22) Filed: Oct. 17, 2013

(65) Prior Publication Data

US 2014/0205419 A1    Jul. 24, 2014

Related U.S. Application Data

(60) Provisional application No. 61/754,209, filed on Jan. 18, 2013.

(51) Int. Cl.
*B60R 9/042*   (2006.01)
*B60R 9/04*    (2006.01)
*B60R 9/06*    (2006.01)
*B60R 9/08*    (2006.01)

(52) U.S. Cl.
CPC . *B60R 9/04* (2013.01); *B60R 9/042* (2013.01); *B60R 9/06* (2013.01); *B60R 9/08* (2013.01)

(58) Field of Classification Search
CPC .............................. B60R 9/0423; B60R 9/042
USPC .................. 224/310, 324, 315; 414/462, 546
See application file for complete search history.

(56) References Cited

U.S. PATENT DOCUMENTS

| 4,278,175 | A |   | 7/1981 | Jackson |       |
|-----------|---|---|--------|---------|-------|
| 4,432,480 | A |   | 2/1984 | Kimmel  |       |
| 4,452,385 | A |   | 6/1984 | Prosen  |       |
| 4,527,827 | A |   | 7/1985 | Maniscalco et al. | |
| 4,944,434 | A |   | 7/1990 | Hamilton |      |
| 4,989,768 | A |   | 2/1991 | McNulty |       |
| 5,297,912 | A | * | 3/1994 | Levi    | 414/462 |
| 5,398,778 | A | * | 3/1995 | Sexton  | 182/127 |
| 5,752,638 | A |   | 5/1998 | Meeks   |       |
| 5,769,291 | A |   | 6/1998 | Chasan  |       |

(Continued)

OTHER PUBLICATIONS

User manual for Thule Hullavator 897XT, 14 pages, earliest known on sale date for the Hullavator is 2005.

*Primary Examiner* — Brian D Nash
*Assistant Examiner* — Corey Skurdal
(74) *Attorney, Agent, or Firm* — Oppedahl Patent Law Firm LLC

(57) ABSTRACT

A sports equipment vehicle for transporting sporting equipment is disclosed. The rack comprises of a plurality of support sections that allow the equipment carrying member to translate from the top of the vehicle roof to the side of the vehicle. Each support section has a bottom member, top equipment holding member, a first leg member, a second leg member, and a strut connected to the bottom member and the top equipment holding member. The support sections move from a transport position that has the top equipment holding member substantially parallel to the vehicle's roof to a loading position where the top equipment holding member is on a substantially inclined plane with a portion below the vehicle's roof. The first and second leg members act as a radius bar for an arc-like motion of the top equipment holding member and the strut assists with the racks movement.

8 Claims, 8 Drawing Sheets

(56) References Cited

U.S. PATENT DOCUMENTS

| | | |
|---|---|---|
| 5,884,824 A | 3/1999 | Spring |
| 6,032,842 A | 3/2000 | Brickner |
| 6,193,123 B1 | 2/2001 | Adamczewski et al. |
| 6,450,379 B1 | 9/2002 | Cook |
| 6,764,268 B2 * | 7/2004 | Levi ............................. 414/462 |
| 6,857,673 B2 | 2/2005 | Lang |
| 7,090,105 B2 | 8/2006 | Adamczewski et al. |
| 7,802,708 B2 | 9/2010 | Adamczewski et al. |
| 8,136,708 B2 | 3/2012 | Sautter et al. |
| 2004/0047716 A1 * | 3/2004 | Hendley et al. ............... 414/462 |
| 2009/0140021 A1 * | 6/2009 | Richter et al. ................ 224/310 |

* cited by examiner

SPORTS EQUIPMENT VEHICLE RACK

BACKGROUND

The present apparatus and method relates to a vehicle rack, mounted atop the roof, for the transportation of a paddle-board, or other types of sporting equipment.

Within the last decade stand-up paddle surfing has been one of the fastest growing water sports in the United States. Stand-up paddle surfing has its roots in Hawaiian culture and is a sport where a "surfer" stands on a paddle-board and uses a paddle to move through the water. Unlike surfing which requires a wave, stand-up paddle surfing can be performed on any body of water because a paddle is used and a wave is not required. Participants of stand-up paddle surfing note that it is a relatively low impact workout that focuses on core strength. Stand-up paddle surfing is particularly popular with women compared to the more traditional sport of surfing.

A paddle-board is an extra-long and buoyant surfboard that is generally over 9 feet in length, with some paddle-boards exceeding 12 feet in length. Paddle-boards are generally between 28-36 inches wide and weigh typically between 20-45 pounds. Due to the length and weight of a paddle-board, transportation is a concern for many participants. Most participants drive to a body of water to participate in stand-up paddle surfing and therefore, attach the paddle-boards to a vehicle. Generally, systems on sale relating to transporting paddle-boards on a vehicle consist of attaching a "rack pad" to a vehicle roof rack. Many vehicles that are marketed to adventurous outdoor types have a roof rack system that is factory installed. The roof of the vehicle has two parallel bottom tracks that run from the front of the roof to the back of the roof on both the passenger and driver sides. Two or more cross-bars attach to the bottom tracks and run from the passenger side track to the driver side track. The rack pads attach to these factory cross-bars and are typically constructed from high density foam that protects the paddle-board from the factory rack. Tie-down straps are then used to secure the paddle board, situated on the rack pad, to the top of the vehicle for transportation. The size and weight of a paddle-board often cause difficulties in maneuvering the paddle-board to the top of the vehicle. This problem is magnified with Sport Utility Vehicles ("SUVs") because the roof height is often taller than an average height person.

Rack pad systems are also sold that attach to an after-market roof rack system. Vehicles that do not have a factory installed roof rack often can install an after-market system that provides the same functions. Thule and Yakima are two well known companies that provide after-market roof rack systems for a wide variety of vehicles.

Prior art for transporting sporting equipment discloses carrying equipment on a roof rack of a vehicle. Additionally, other prior art for carrying long loads on a vehicle disclose mounting the load on the side of a vehicle with supports.

Participants in stand-up paddle surfing would typically like to keep the use of any side doors and windows to bring friends along and for easy access to gear stored inside the vehicle. Participants would also like to not have the hassle of maneuvering the very long paddle-board to the top of the vehicle for transport and be able to use any factory installed rack system on the vehicle.

The foregoing example of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

One aspect of the present embodiment is to provide easier access for loading sporting equipment onto a roof of a vehicle for transport. The rack has a loading position which is along the side of the vehicle, allowing for a lower loading platform. The transport position is on the roof of the vehicle. Transporting the equipment on the roof of a vehicle allows for access to all the side doors, windows, and hatches on the vehicle during transport.

Another aspect of the present embodiment is to provide mechanical support strut to assist in movement of the rack from the loading position to the transport position and back.

An additional aspect of the present embodiment is to provide a compact mechanical design allowing the equipment holding member to translate from the loading position to the transport position and back in an arc-like motion with relatively few moving parts.

A further aspect of the present embodiment is to provide a removable rack that is attachable to a wide variety of roof rack systems on many different vehicles, including factory installed rack systems and after-market rack systems.

In addition to the exemplary aspects and embodiments described above, further aspects and embodiments will become apparent by reference to the accompanying drawings forming a part of this specification wherein like reference characters designate corresponding parts in the several views.

In the exemplary embodiment a sports equipment transport rack for mounting on a vehicle roof comprises of a plurality of support sections. The support sections comprise a bottom member that attaches to a crossbar mounted on the top of a vehicle with a loading and a non-loading side, a top equipment holding member that holds an equipment load with a loading and a non-loading side, a first leg member with an upper portion and a lower portion, and a second leg member with an upper and a lower portion. The lower portion of the first leg member is pivotally connected to the bottom member at a first connection point and the lower portion of the second leg member is also pivotally connected to the bottom member at a second connection point, with the first and second connection points offset. The upper portion of the first leg member is pivotally connected to the top equipment holding member at a first connection point and the upper portion of the second leg member is also pivotally connected to the top equipment holding member at a second connection point, with the first and second connection points offset. The support sections have a transport position where the top equipment holding member is bearing on the bottom member located above the roof plane of the vehicle and supporting the equipment load. Additionally, the first leg member and the second leg member in the transport position are substantially parallel to each other. The support sections also have a loading position where the top equipment holding member is substantially at an inclined plane and the loading side is partially below the roof plane of the vehicle supporting the equipment load. Additionally, the first leg member and second leg member in the loading position are not substantially parallel to each other and the first leg member and second leg member support the top equipment member away from the side of the vehicle. The top equipment holding member moves from the transport position to the loading position and back in an arc shaped motion facing substantially upwards in direction from the ground and the first leg member and the second leg member acting as a radius bar for the movement of the top equipment holding member. Furthermore, a strut is pivotally connected to the bottom member at a fixed point and pivotally connected to the top equipment holding member at a fixed point. The strut compresses and extends when the top equipment holding member moves relative to the bottom member from the transport position to the loading position and back supporting the force of the movement of the equipment load. The first and second connection points may also be fixed connection points.

Before explaining the disclosed embodiment of the present invention in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION OF THE DRAWINGS

Figure 1:
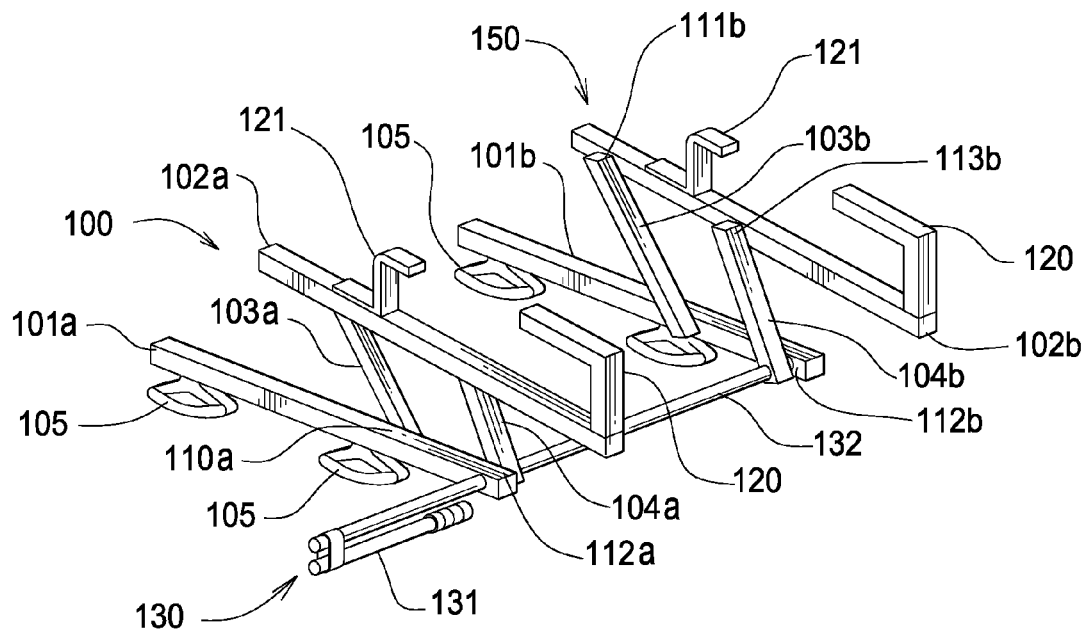
FIG. 1 is an isometric view of the first embodiment for a sports equipment vehicle rack between the loading position and the transport position.

FIG. 1 is an isometric view of the first embodiment for a sports equipment vehicle rack between the loading position and the transport position. The rack is designed to be mounted on the cross-bars of either a factory mounted vehicle rack or an after-market vehicle rack. For clarity, the cross-bars that run from the driver side to the passenger side of the vehicle and attach to the roof are not shown in the accompanied figures. In the depicted embodiment the sports equipment vehicle rack has three main sections: a front support 100, a rear support 150, and a handle crank arm 130. It should be understood that while two substantially parallel supports are shown in the depicted embodiment the sports equipment vehicle rack may have any number of substantially parallel supports, such as three or four, that connect to the vehicle's cross-bars. Each support has a loading side that corresponds to the side of the vehicle to which the sports equipment is mounted from, and a non-loading side.

The front support 100 comprises of a bottom member 101a, a top equipment holding member 102a, a first leg member 103a, and a second leg member 104a. In the depicted embodiment the bottom member 101a has two mounting brackets 105 that attach to the underside of the bottom member 101a for mounting the front support 100 on the vehicle rack cross-bars. It should be understood that while two mounting brackets are shown in the depicted embodiment, more than two mounting brackets may be used, or one continuous mounting bracket extending the length of the bottom member may be used. The mounting brackets 105 fix the bottom member 101a to the vehicle so that no movement, rotation or translation, is possible. Furthermore, the mounting brackets 105 are able to connect to multiple cross-bar types, including circular, square, rectangle, and oval shaped cross-bars.

In the depicted embodiment the bottom member 101a with a loading and a non-loading side has a hollow square cross-section shape with caps on the end and is constructed out of aluminum, to save weight, and powder-coated for protection and aesthetics. It is understood that the bottom member may be any cross-sectional shape including, but not limited to, circular, oval, or rectangular cross-sections. Oval or oval type cross-section shapes will provide a more aerodynamic shape when mounted on a vehicle. In addition, the bottom member may be constructed out of a variety of materials including, but not limited to, stainless steel, steel, titanium, and carbon fiber.

Figure 3:
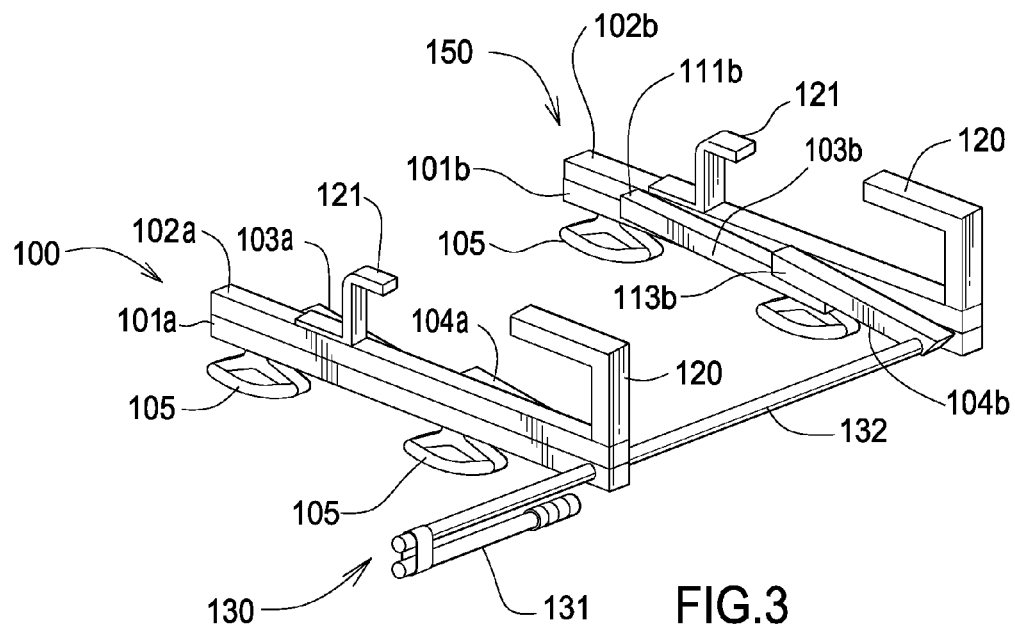
FIG. 3 is an isometric view of the first embodiment for a sports equipment vehicle rack in the transport position.

The first leg member 103a is shown in its first position, the transport position, in FIG. 3. The bottom of the first leg member 103a is pivotally connected 110a at a fixed point to the bottom member 101a. This connection 110a allows the first leg member 103a to rotate about a fixed connection point along the bottom member 101a. Additionally, the connection 110a transfers the equipment load forces from the first leg member 103a into the bottom member 101a. In the depicted embodiment the connection point 110a comprises of a through-bolt between a fixed point on the first leg member 103a and on the bottom member 101a. A spacer is placed between the two members and the through-bolt only allows for rotational movement about the connection axis with no translational movement. It is understood that any type of fixed-point pivot connection, other then a trough-bolt, can be used for the pivot connection.

Figure 2:
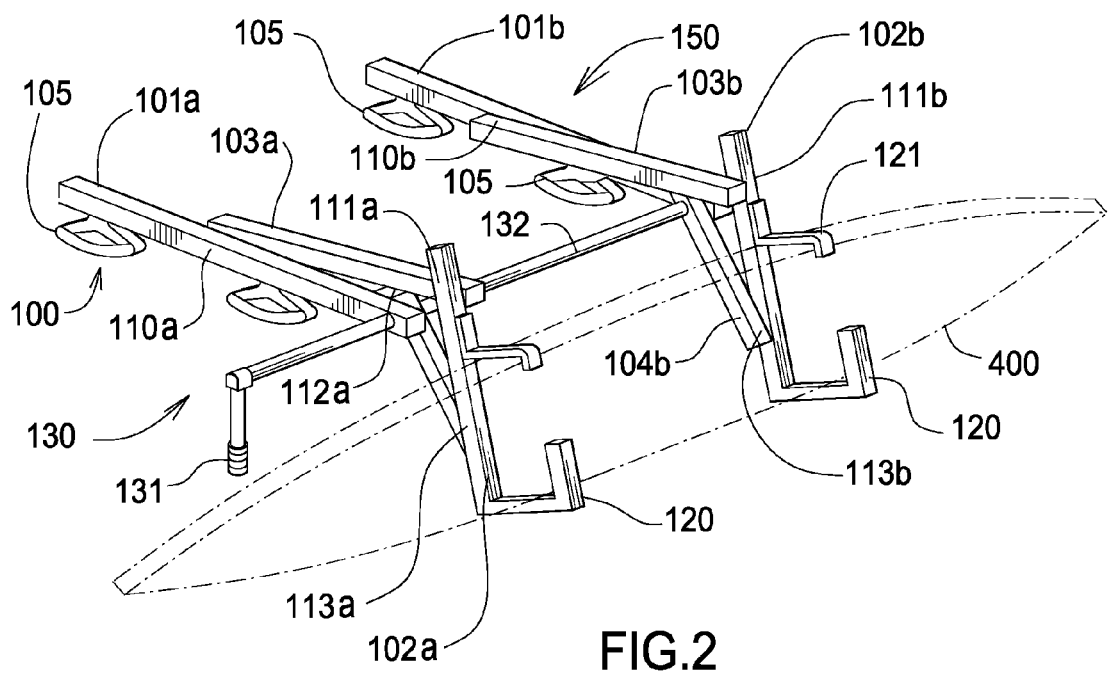
FIG. 2 is an isometric view of the first embodiment for a sports equipment vehicle rack in the loading position.

The second position for the first leg member 103a, shown in FIG. 2, is the loading position. The rack is held in the loading position and away from the side of the vehicle by the first leg member 103a bearing on the end of the second leg member 104a in the loading position. This restriction in angular rotation for the first leg member 103a prevents the sports equipment vehicle rack from contacting the side of the vehicle preventing damage when in the loading position.

The top of the first leg member 103a is also pivotally connected 111a at a fixed point to the top equipment holding member 102a, near the non-loading side, as shown in FIG. 1. This connection 111a allows the first leg member 103a to rotate about a fixed connection point along the top equipment holding member 102a. Additionally, the connection 111a transfers the equipment load forces from the top equipment holding member 102a into the first leg member 103a. In the depicted embodiment the connection point 111a comprises of a through-bolt between a fixed point on the first leg member 103a and on the top equipment holding member 102a. Similar to the other members, in the depicted embodiment the first leg member 103a is constructed out of powder-coated aluminum with a hollow square cross-section shape. It should be understood that a variety of materials and cross-sectional shapes may be used for this member as well as any other members within the sports equipment vehicle rack.

The second leg member 104a is also shown in its first position, the transport position, in FIG. 3. The bottom of the second leg member 104a is fixedly connected 112a to the handle crank arm 130 adjacent to the bottom member 101a at the loading side. The fixed connection 112a to the handle crank arm 130 allows the second leg member 104a to rotate in conjunction with the handle crank arm 130 from the first position to a second position shown in FIG. 2, the loading position, when the handle crank arm 130 is moved. The bottom member 101a, however, is not connected to the second leg member 104a. The fixed connection 112a allows the handle crank arm 130 to be treaded through the bottom member 101a and rotate within. The forces that result from the equipment load on the top equipment holding member 102a are transferred to the second leg member 104a, into the handle crank arm 130, and then into the bottom member 101a. Connection 112a allows for the equipment load forces to be transferred from the handle crank arm 130 to the bottom member 101a while still allowing rotation of the handle crank arm 130.

The top of the second leg member 104a is pivotally connected 113a at a fixed point on the top equipment holding member 102a as shown in FIG. 1. This connection 113a allows the second leg member 104a to rotate about a fixed connection point along the top equipment holding member 102a. Additionally, the connection 113a transfers the equipment load forces from the top equipment member 102a into the second leg member 104a. In the depicted embodiment the connection point 113a comprises of a through-bolt between a fixed point on the second leg member 104a and on the top equipment holding member 102a.

The second position for the second leg member 104a, shown in FIG. 2, is the loading position with the leg member positioned below the vehicle roof height. Similar to the other members, in the depicted embodiment the second leg member 104a is constructed out of powder-coated aluminum with a hollow square cross-section shape. It should be understood that a variety of materials and cross-sectional shapes may be used for this member as well as any other members within the sports equipment vehicle rack.

The top equipment holding member 102a is attached to both the first leg member 103a by connection 111a at a fixed point and the second leg member 104a by connection 113a at a fixed point. The top equipment holding member 102a is the sports equipment carriage. The top equipment holding member 102a comprises a support base 120 and a top latch 121 as the carriage. In the depicted embodiment the support base 120 is a substantially L-shaped member rigidly attached to the loading side of the top equipment holding member 102a at a substantially right angle. It is understood that other forms and shapes of support bases may be used for loading and securing sports equipment. In the transport position the support base 120 restricts the lateral movement of the paddle-board and in the loading position the paddle-board is vertically supported by the support base 120. The top latch 121 attaches to the non-loading side of the top equipment holding member 102a. In the depicted embodiment the top latch is a substantially S-shaped member that can slide axelially along the top equipment holding member 102a to secure various widths of paddle-boards. When the top latch 121 is secured on the paddle-board, the top latch prevents the paddle-board from lateral movement when the vehicle rack is in the transport position. It should be appreciated that other forms of top latches can be used to secure the paddle-board. The top latch could clip onto the top equipment member or even be pivotally attached to the support base and fully wrap around the paddle board. Additionally, it should be noted that other sports equipment can attach to the top equipment member. Instead of carrying a paddle-board the rack may carry a kayak, skis, or other sporting equipment.

Similar to the other members, in the depicted embodiment the top equipment holding member 102a, base support 120, and top latch 121 are constructed out of powder-coated aluminum with a hollow square cross-section shape. It should be understood that a variety of materials and cross-sectional shapes may be used. Additionally, in other embodiments a protective padding such as rubber or high-density foam may be applied to each of these members to protect the paddle-board 400 during transport.

The rear support section 150 in the depicted embodiment is a mirror image of the front support section 100. It comprises of a bottom member 101b, a top equipment holding member 102b with a support base 120 and a top latch 121, a first leg member 103b, and a second leg member 104b. The rear support section 150 is a mirror image of the front support section 100 to reduce the length of the handle crank arm 130. It is understood that the rear support section 150 can also be duplicative of the front support section 100.

In the transport position shown in FIG. 3, the top equipment holding member 102a and 102b is substantially parallel in relation to the bottom member 101a and 101b. The paddle-board 400 is supported by the top equipment holding member 101a and 101b in the transport position with the top equipment holding member 102a and 102b bearing directly on the bottom member 101a and 101b. In the loading position shown in FIG. 2, the top equipment holding member 102a and 102b is substantially perpendicular in relation to the bottom member 101a and 101b. The support base 120 attached to the top equipment holding member 102a and 102b is at a lower elevation then the bottom member 101a and 102b and the vehicle roof height. By lowering the elevation for loading a paddle-board 400, users will not have to lift the paddle-board or other sports equipment vertically as high in relation to the final transport height.

To move both the front support member 100 and the rear support member 150 from the transport position to the loading position a handle crank arm 130 is used. In the depicted embodiment the handle crank arm 130 is constructed out of powder coated aluminum with a hollow circular cross section shape. It should be understood that a variety of materials and cross-sectional shapes may be used. In the depicted embodiment the handle crank arm 130 is threaded through the bottom member 101a and 101b and the bottom of the second leg member 104a and 104b, at the loading side, on both the front and rear support sections 100 and 150. The connection 112a and 112b allows the handle crank arm 130 to rotate freely about a fixed point within the bottom member 101a and 101b while still transferring the equipment load forces into the bottom member 101a and 101b. The handle crank arm 130, however, is fixed to the bottom of the second leg member 104a and 104b allowing the second leg member 104a and 104b to rotate with the handle crank arm 130 when moved. This allows the user to rotate the handle crank arm 130 to move the vehicle rack from the transport position to the loading position and back to the transport position. The handle crank arm 130 has a spacer between the crank arm and the bottom member 101a and 101b so the aluminum does not rub directly against aluminum.

The handle crank arm 130 in the depicted embodiment has a collapsible handle 131 to assist users in moving the vehicle rack from the transport position to the loading position and back. In FIG. 3 the handle 132 is stored against the arm 132 for transport, the collapsible handle 132 extends out to a substantially perpendicular position relative to the arm 132 as shown in FIG. 2. The collapsible handle 131 gives users more torque when moving the vehicle rack between the transport and loading positions. It is understood that other ways to move rack positions can also be used. The vehicle rack may be counterweighted to assist with moving the crank arm 130, or the crank arm may be spring loaded to assist movement.

In additional embodiments of the invention not shown the distance between front and rear support sections will be adjustable to accommodate different vehicle cross bar locations and sun and moon roof locations respectively.

In yet other embodiments a electric or mechanical motor is attached to the vehicle rack to move the front and rear support sections from the transport position to the loading position and back.

Figure 4:
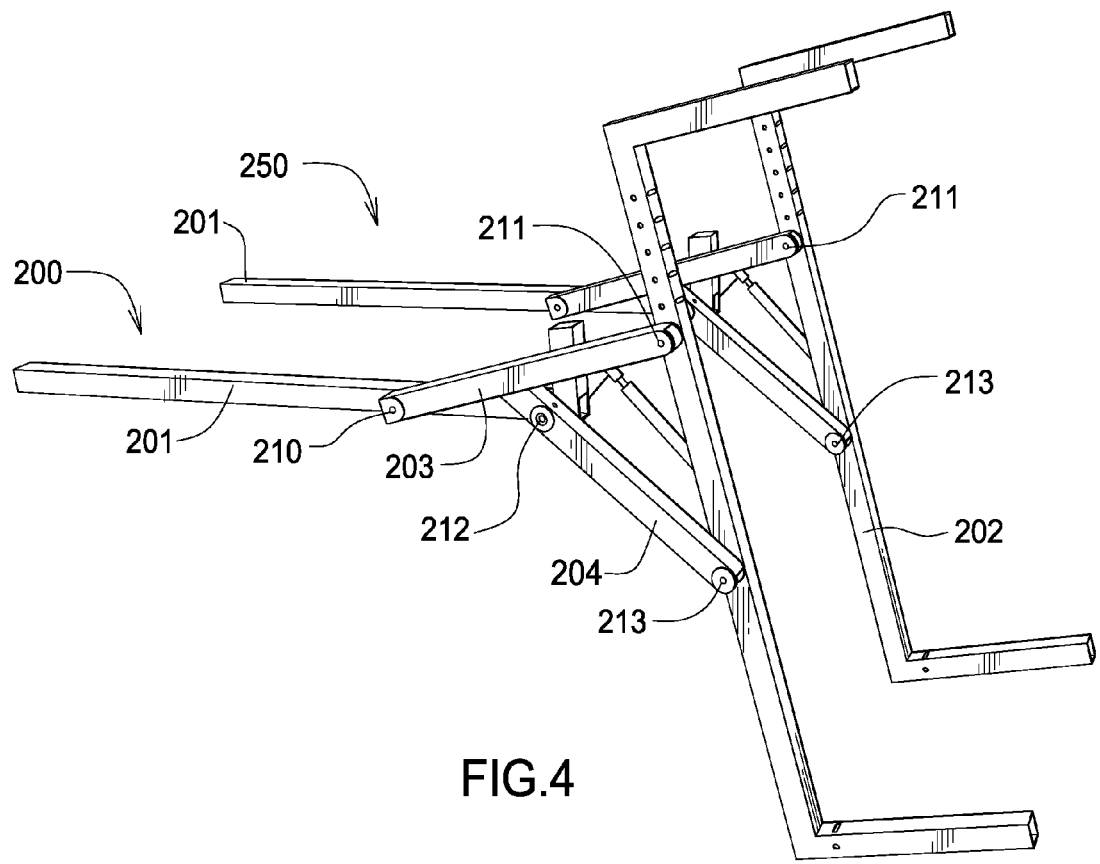
FIG. 4 is an isometric view of the second embodiment for a sports equipment vehicle rack in the loading position.

A second embodiment of the invention, shown in FIGS. 4-9, discloses a slightly different set up to a sports equipment vehicle rack, while essentially performing the same function as the first embodiment described previously. As shown in FIG. 4 the second depicted embodiment has three main sections: a front support 200, a rear support 250, and a handle arm 260 that is not shown in the figures. It should be understood that while two substantially parallel supports are shown in the depicted embodiment the sports equipment vehicle rack may have any number of substantially parallel supports, such as three or four, that connect to the vehicle and support the sports equipment for transportation. Each support has a loading side that corresponds to the side of the vehicle to which the sports equipment is mounted from, and a non-loading side.

The front support 200 comprises a bottom member 201, a top equipment holding member 202, a first leg member 203, and a second leg member 204. In the depicted embodiment, similar to the first embodiment, the bottom member 201 has two mounting brackets 105, not shown, that attach to the underside of the bottom member 201 for mounting the front support 200 on the vehicle rack cross-bars. The mounting brackets 105, not shown, fix the bottom member 201 to the vehicle so that no movement, rotation or translation, is possible.

Figure 5:
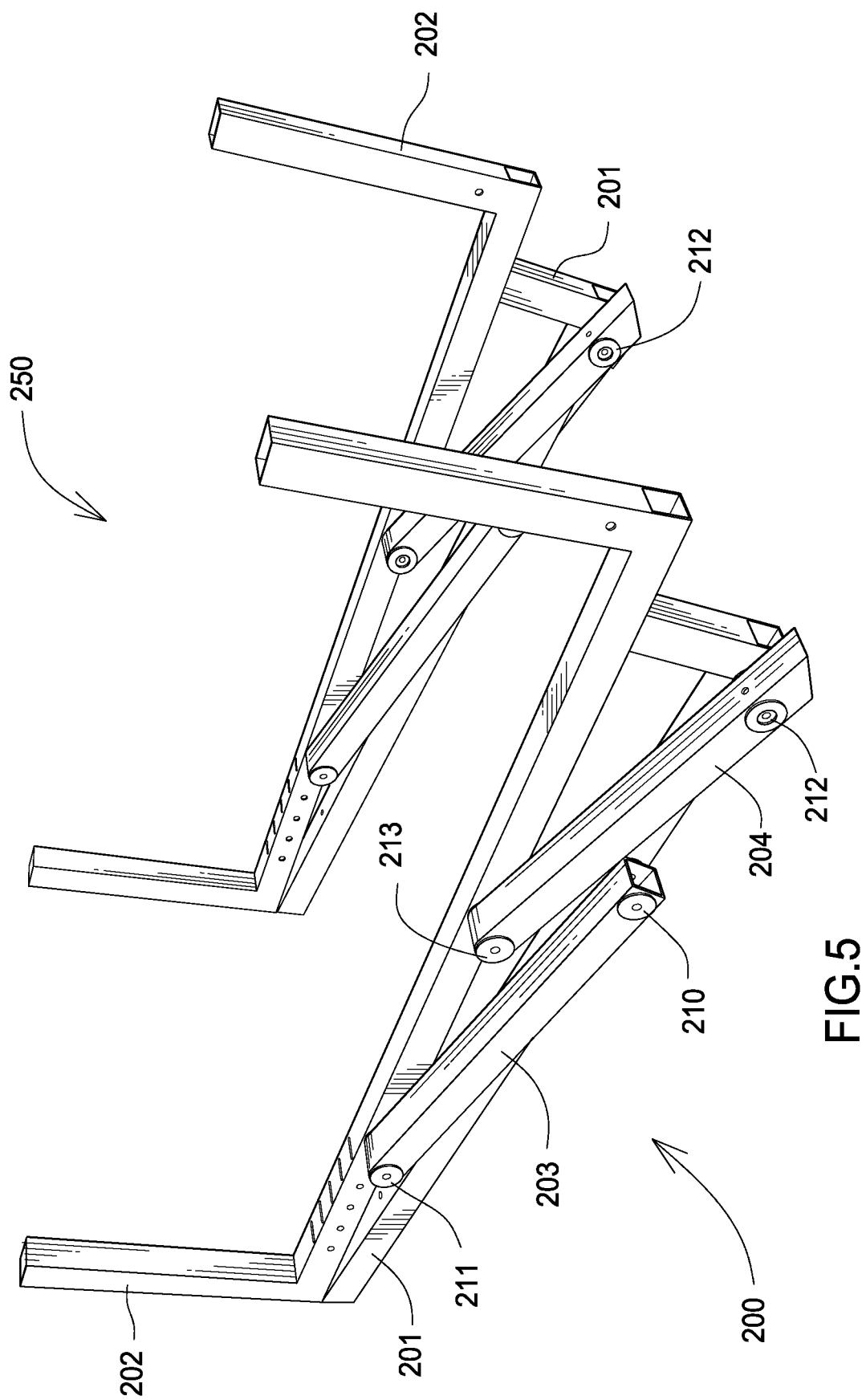
FIG. 5 is an isometric view of the second embodiment for a sports equipment vehicle rack in the transport position.

In the depicted embodiment the bottom member 201 is a substantially L-shaped member with a long horizontal leg and a short vertical leg. The short leg of the bottom member 201 is located on the loading side of the member and supports the top equipment holding member 202 while in the transport position as shown in FIG. 5. The short leg is a bearing member that helps transfer the load from the top equipment member 202 into the bottom member 201 and out through the mounting brackets 105, not shown, to the vehicle's roof when the rack is in the transport position.

The first leg member 203 is shown in its first position, the transport position, in FIG. 5. The bottom of the first leg member 203 is pivotally connected 210 at a fixed point to the bottom member 201. This connection 210 allows the first leg member 203 to rotate about a fixed connection point along the bottom member 201. Additionally, the connection 210 transfers the equipment load forces from the first leg member 203 into the bottom member 201. In the depicted embodiment the connection point 210 comprises of a through-bolt between a fixed point on the first leg member 203 and on the bottom member 201. A spacer is placed between the two members and the through-bolt only allows for rotational movement about the connection axis with no translational movement. It is understood that any type of pivot connection, other then a trough-bolt, can be used for this connection.

The second position for the first leg member 203, shown in FIG. 4, is the loading position. The rack is held in the loading position and away from the side of the vehicle by the first leg member 203 bearing on the end of the second leg member 204 in the loading position. This restriction in angular rotation for the first leg member 203 prevents the sports equipment vehicle rack from contacting the side of the vehicle preventing damage.

The top of the first leg member 203 is also pivotally connected 211 at a fixed point to the top equipment holding member 202 as shown in FIGS. 4 & 5. This connection 211 allows the first leg member 203 to rotate about a fixed connection point along the top equipment holding member 202. Additionally, the connection 211 transfers the equipment load forces from the top equipment holding member 202 into the first leg member 203. In the depicted embodiment the connection point 211 comprises of a through-bolt between a fixed point on the first leg member 203 and on the top equipment holding member 202. Similar to the other members, in the depicted embodiment the first leg member 203 is constructed out of powder-coated aluminum with a hollow square cross-section shape. It should be understood that a variety of materials and cross-sectional shapes may be used for this member as well as any other members within the sports equipment vehicle rack.

The second leg member 204 is also shown in its first position, the transport position, in FIG. 5. The bottom of the second leg member 204 is pivotally connected 212 at a fixed point to the bottom member 201 at the loading side. This connection 212 allows the second leg member 204 to rotate about a fixed connection point along the bottom member 201. Additionally, the connection 212 transfers the equipment load forces from the second leg member 204 into the bottom member 201. In the depicted embodiment the connection point 212 comprises of a through-bolt between a fixed point on the second leg member 204 and on the bottom member 201.

The top of the second leg member 204 is also pivotally connected 213 at a fixed point on the top equipment holding member 202 as shown in FIGS. 4 & 5. This connection 213 allows the second leg member 204 to rotate about a fixed connection point along the top equipment holding member 202. Additionally, the connection 213 transfers the equipment load force from top equipment holding member 202 into the second leg member 204. In the depicted embodiment the connection point 213 comprises of a through-bolt between a fixed point on the second leg member 204 and on the top equipment holding member 202.

The second position for the second leg member 204, shown in FIG. 4, is the loading position with the member extending below the vehicle roof height. In the depicted embodiment connection 212 transfers the equipment load forces from the first leg member 203 bearing on the end of the second leg member 204 into the bottom member 201. Similar to the other members, in the depicted embodiment the second leg member 204 is constructed out of powder-coated aluminum with a hollow square cross-section shape. It should be understood that a variety of materials and cross-sectional shapes may be used for this member as well as any other members within the sports equipment vehicle rack.

Figure 7:
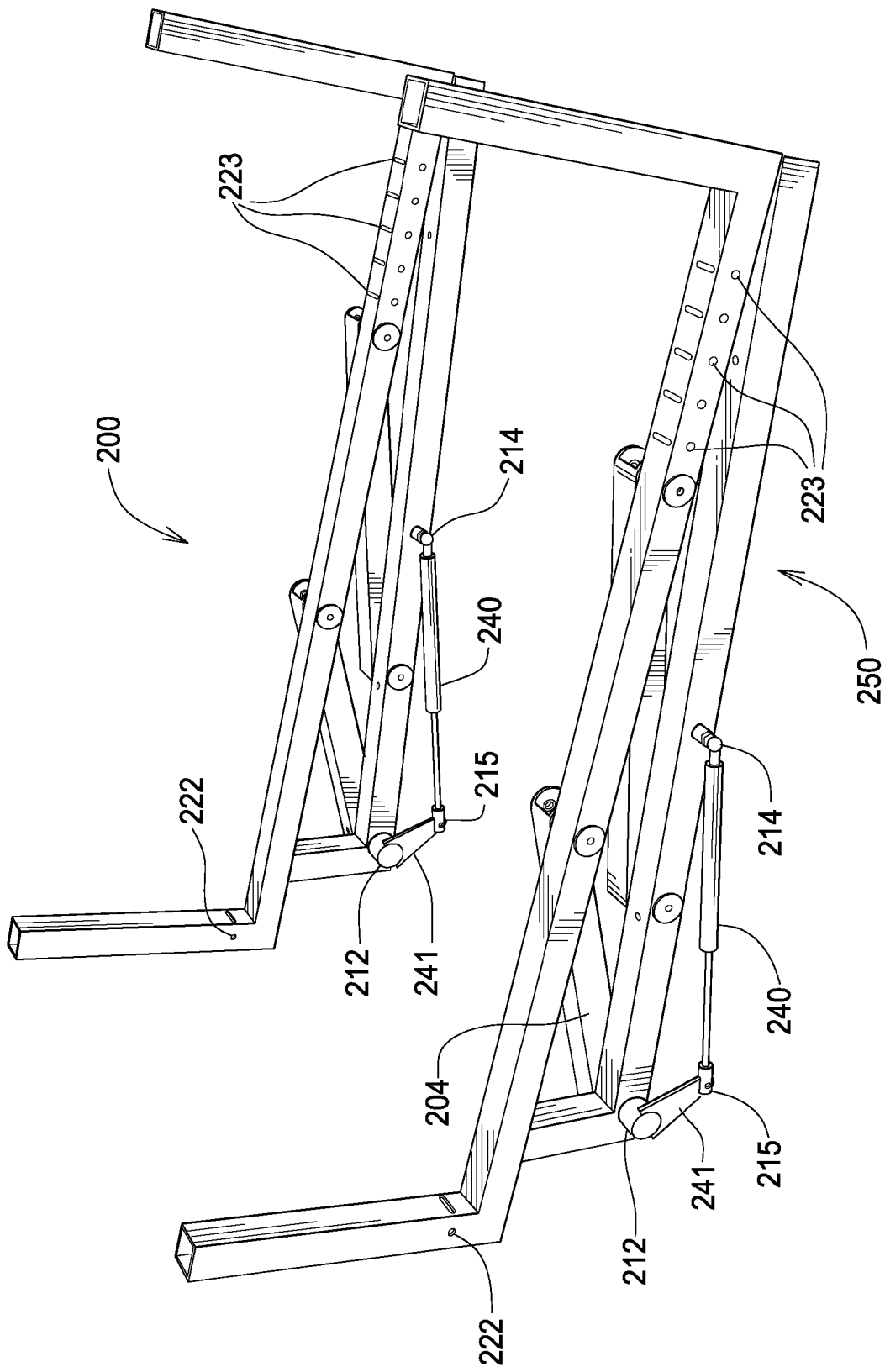
FIG. 7 is a reverse isometric view of the second embodiment for a sports equipment vehicle rack in the transport position.

The top equipment holding member 202 is attached to both the first leg member 203 by connection 211 at a fixed point and the second leg member 204 by connection 213 at a fixed point. In the depicted embodiment the top equipment holding member 202 is a substantially U-shaped member facing upwards with an adjustable strap 221, not shown, to hold down the paddle-board or other loads. The top equipment holding member 202 has a long horizontal leg and two short vertical legs on both ends. The top equipment holding member 202 has a loading side that supports the load as shown in the loading position of FIG. 4 and an opposite non-loading side. The adjustable strap 221, not shown, attaches to the loading side of the top equipment holding member 202 at a fixed position 222 near the vertical leg as shown in FIG. 7. The other end of the adjustable strap 221, not shown, attaches to the non-loading side of the top equipment holding member 202 at a plurality of locations 223 determined by the size of the paddle-board or other load. In the transport and loading position the adjustable strap 221, not shown, restricts the movement of the paddle board or other load. In the depicted embodiment the adjustable strap is high strength fabric. It should be appreciated that other forms of securement can be used to hold-down the paddle-board to the rack. Additionally, it should be noted that many other types of sport equipment can attach to the top equipment member. Instead of carrying a paddle-board the rack may carry a kayak, skis, or other sporting equipment.

Similar to the other members, in the depicted embodiment the top equipment holding member 202, is constructed out of powder-coated aluminum with a hollow square cross-section shape. It should be understood that a variety of materials and cross-sectional shapes may be used. Additionally, in other embodiments a protective padding such as rubber or high density foam may be applied to the member to protect the paddle-board 400 during transport.

The rear support section 250 in the depicted embodiment is constructed in a similar way as the front support section 200. It comprises of a bottom member 201, a top equipment holding member 202, a first leg member 203, and a second leg member 204. By constructing the rear support section and the front support section in the same manner the cost of manufacturing the vehicle rack is reduced.

Figure 8:
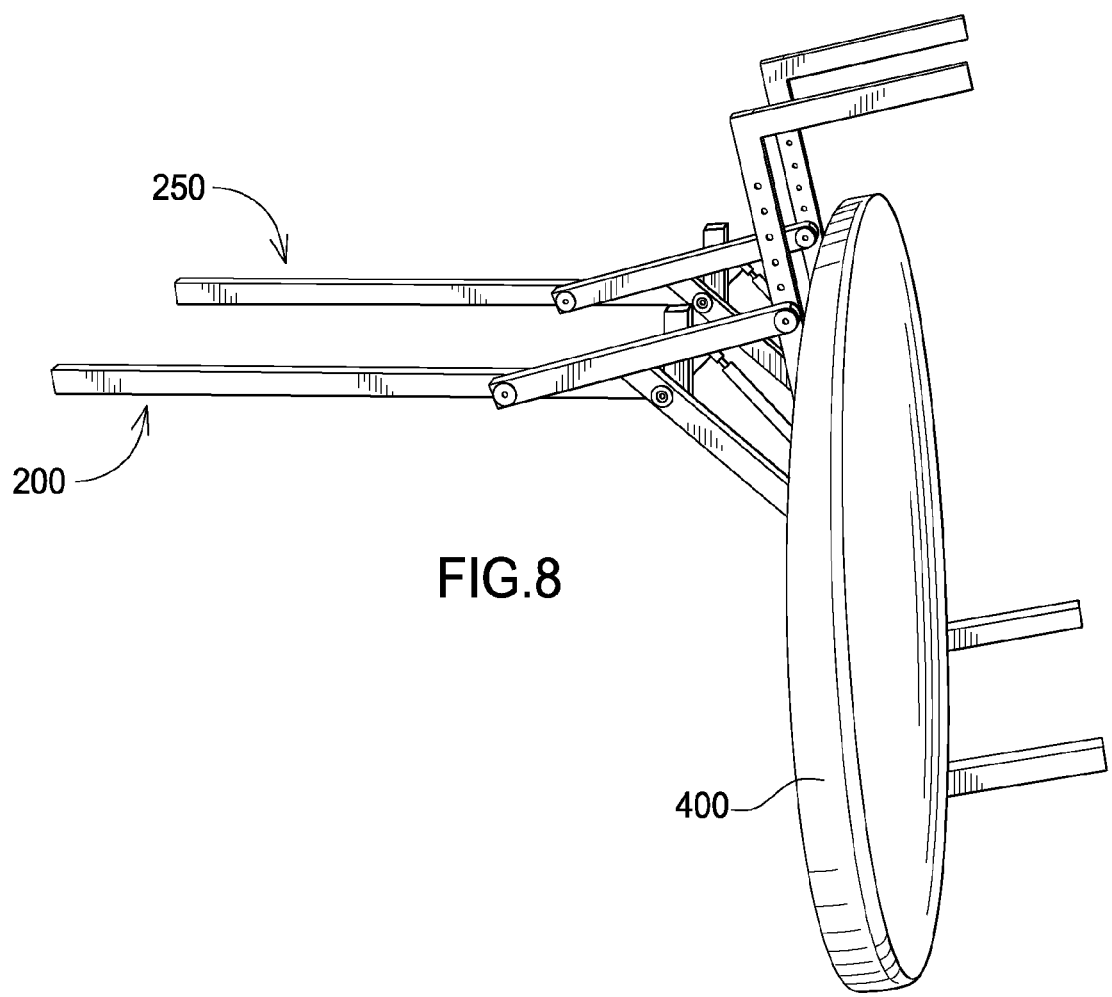
FIG. 8 is an isometric view of the second embodiment for a sports equipment vehicle rack showing a paddle-board attached to the rack in the loading position.
Figure 9:
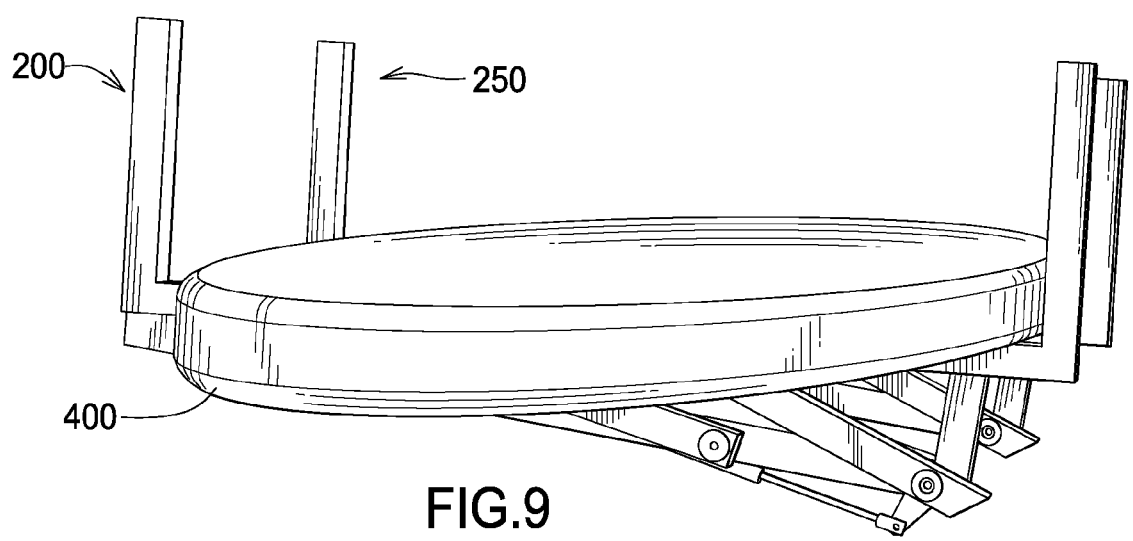
FIG. 9 is an isometric view of the second embodiment for a sports equipment vehicle rack showing a paddle-board attached to the rack in the transport position.

In the transport position shown in FIG. 5, the top equipment holding member 202 is substantially parallel in relation to the bottom member 201. The paddle-board is supported by the top equipment holding member as shown in FIG. 9 with the top equipment holding member 202 bearing directly on the bottom member 201. In the loading position shown in FIG. 4, the top equipment holding member 202 is substantially perpendicular and at an inclined plane in relation to the bottom member 201. The loading side of the top equipment holding member 202 is at a lower elevation then the bottom member 201 and the vehicle roof height. By lowering the elevation for loading a paddle-board 400, users will not have to lift the paddle-board or other sports equipment vertically as high in relation to the final transport height as shown in FIG. 8.

Figure 6:
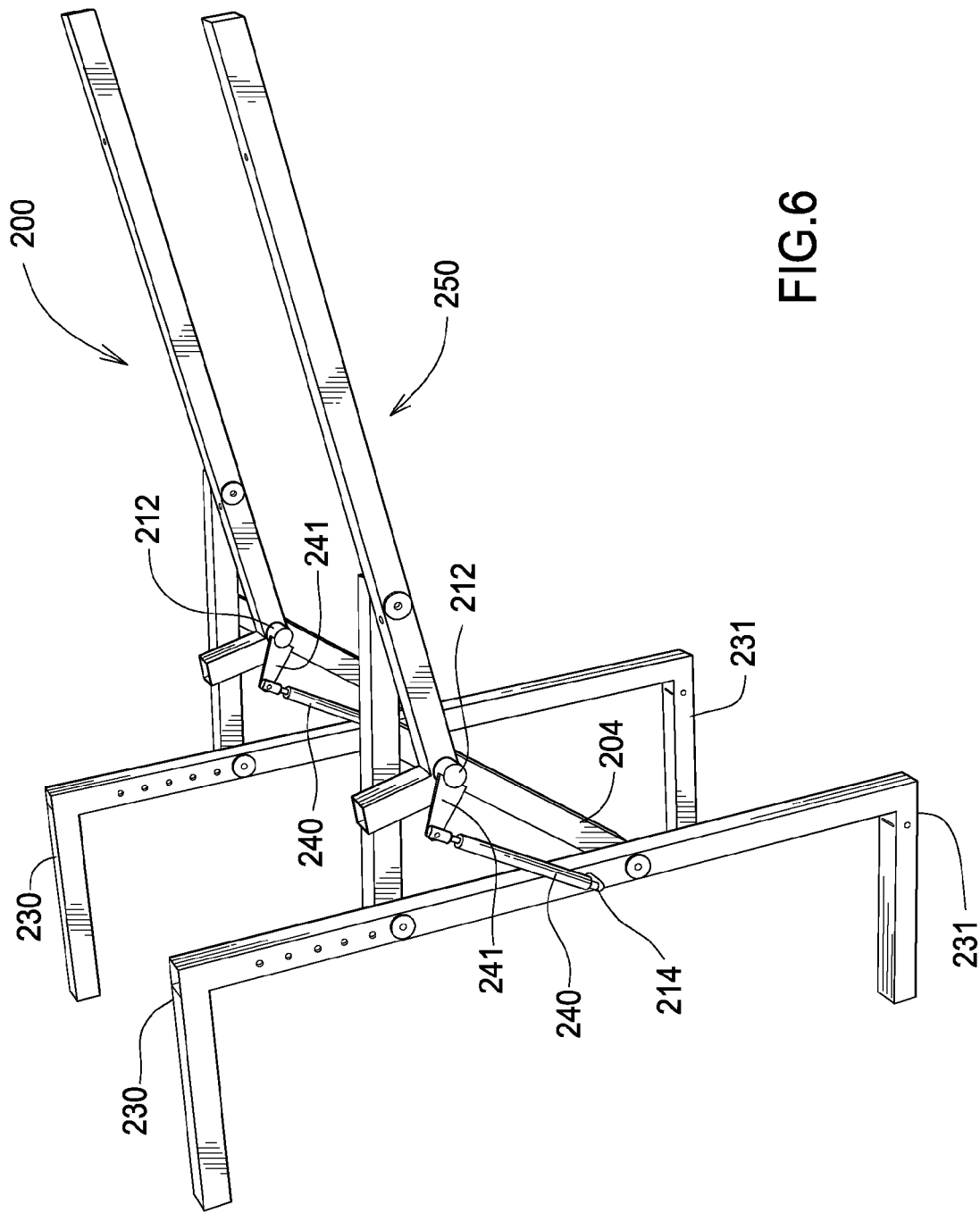
FIG. 6 is a reverse isometric view of the second embodiment for a sports equipment vehicle rack in the loading position.

To move both the front support member 200 and the rear support member 250 from the transport position to the loading position an attachable handle arm 260, not shown, is used. The handle arm is a long straight member with a handle that in the depicted embodiment is constructed out of powder-coated aluminum with a hollow circular cross-section shape. It should be understood that a variety of materials and cross-sectional shapes may be used. In the depicted embodiment the non-handle side of the handle arm attaches at a point 230 on the non-loading side of the top equipment holding member 202 at the base U-shaped member leg as shown in FIG. 6. This connection can be made at either the front or rear support member. The user, standing on the non-loading side of the vehicle rack uses the handle arm 260, not shown, to push the rack into the loading position. The handle arm can detach and be stored inside the bottom member 201 during transport or inside of the vehicle. When a paddle-board is attached to the rack both front and rear support members will move together, however, if no load is attached to the rack then each support member will move separately. It is also understood that this handle can also be a telescoping handle to save storage space. Additionally, the handle may be designed to store within one of the hollow shaped support members.

To move both the front support member 200 and the rear support member 250 from the loading position to the transport position a user will stand on the loading side of the vehicle rack and push-up on the loading side of the top equipment holding member 202. This movement can be performed by the users hands or with the handle arm 260, not shown, at attachment point 231 on the loading side of the top equipment holding member 202. Because the rack is supporting the paddle-board load and a strut 240 is attached, the force required to move the load to the transport position is less than if the rack was not used.

When the rack is moved from the loading position to the transport position and back the first leg member 203 and second leg member 204 act as radius bars for the top equipment holding member 202. The top equipment holding member 202 moves in an arc-like motion always facing substantially upwards and supporting the equipment load.

In other embodiments, not shown, both the front support member and the rear support member are connected so as to move to the loading position together and not separately when equipment is not loaded onto the rack.

To facilitate a constant, smooth motion between the loading position and transport position a strut 240 is mounted on both the front support member 200 and rear support members 250. In the depicted embodiment, shown in FIGS. 6 & 7, the strut attaches to the top equipment holding member 202 at a fixed point 214 and to the pivot connection 212 between the second support leg 204 and the bottom member 201. When the rack is moved between the transport and loading positions the strut 240 extends and compresses assisting the movement of the rack. As shown in FIG. 7 the strut 240 is shown in its first position while the rack is in its transport position. One end of the strut 240 is pivotally connected 214 to the top equipment holding member 202. This allows the strut 240 to rotate around a fixed point on the top equipment holding member 202. The other end of the strut 240 is pivotally attached at a fixed point 215 to a plate 241 at the connection 212 between the second support leg 204 and the bottom member 201. The plate 241 rotates in conjunction with the second support leg 204 around the bottom member 201. The strut 240 rotates about a fixed point 215 on the plate 241. In the depicted embodiment the plate 241 is a powder coated aluminum plate. It is understood that this plate may be constructed out of a wide variety of materials.

FIG. 6 shows the strut 240 in its second position while the rack is in its loading position. In the second position plate 241 has rotated in conjunction with the second support leg 204. In the depicted embodiment the strut 240 is similar to the struts found on vehicle tailgate supports. It should be noted that many different types of struts such as hydraulic and pneumatic struts can be used. Additionally, the plate 241 can be made out of other materials such as stainless steel. With the strut being exposed to the elements it is understood that a protective cover may encompass the strut elements.

FIGS. 8 & 9 show the vehicle rack in its loading and transport positions respectively. Both figures depict how a paddle-board fits onto the vehicle rack.

Figure 10:
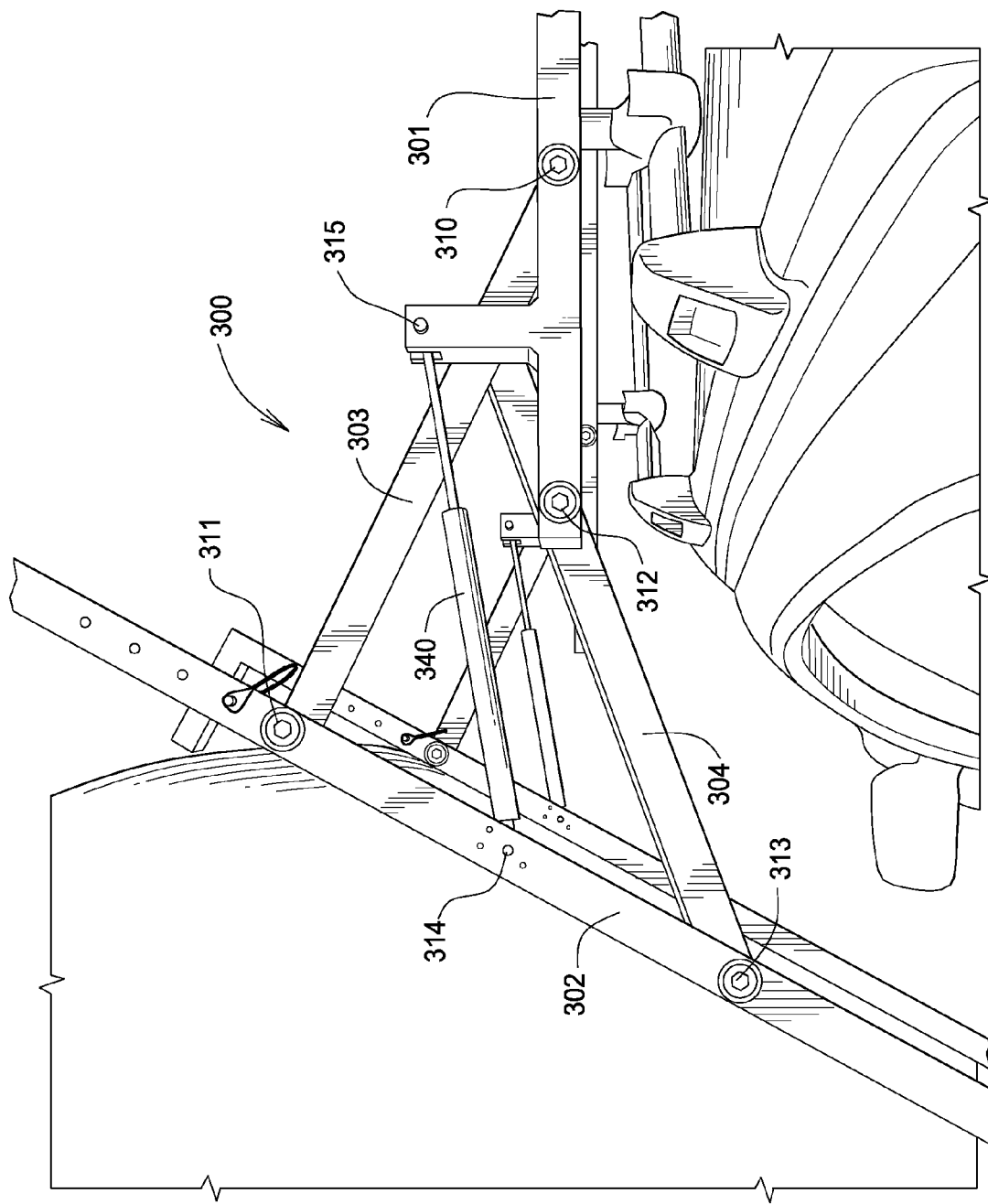
FIG. 10 is an isometric view of the third embodiment for a sports equipment vehicle rack in the loading position.
Figure 11:
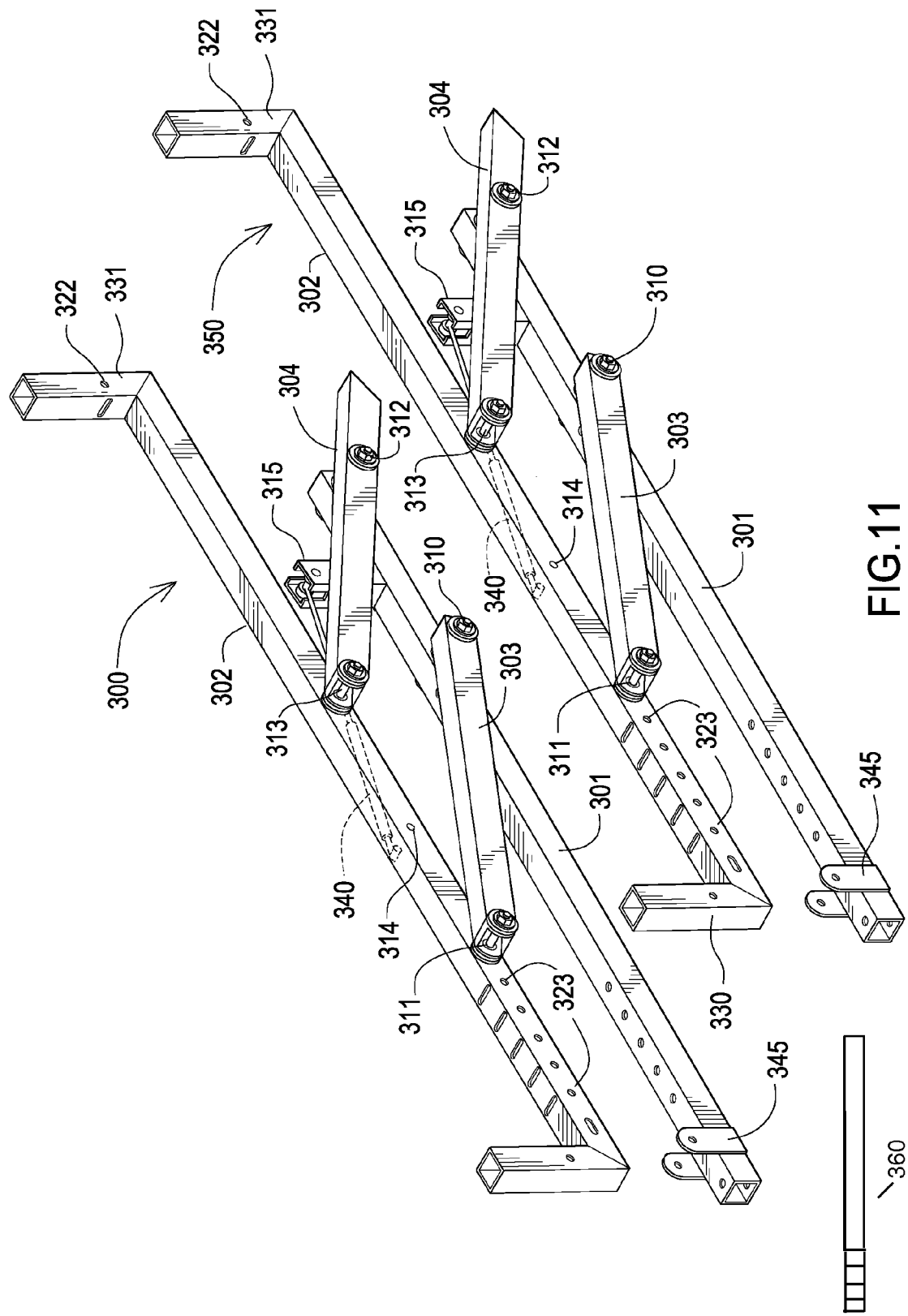
FIG. 11 is an isometric view of the third embodiment for a sports equipment vehicle rack in the transport position.

A third embodiment of the invention, shown in FIGS. 10-11, discloses another modification to the sports equipment vehicle rack, while essentially performing the same function as the first two embodiments described previously. As shown in FIG. 10 the third depicted embodiment has again three main sections: a front support 300, a rear support 350, and a handle arm 360 that is not shown in the Figures. It should be understood that while two substantially parallel supports are shown in the depicted embodiment the sports equipment vehicle rack may have any number of substantially parallel supports, such as three or four, that connect to the vehicle and support the sports equipment for transportation. Again, each support has a loading side that corresponds to the side of the vehicle to which the sports equipment is mounted from, and a non-loading side.

The front support 300 comprises a bottom member 301, a top equipment holding member 302, a first leg member 303, and a second leg member 304. In the depicted embodiment, similar to the other embodiments, the bottom member 301 has two mounting brackets 105, not shown, that attach to the underside of the bottom member 301 for mounting the front support 300 on the vehicle rack cross-bars. The mounting brackets 105, not shown, fix the bottom member 301 to the vehicle so that no movement, rotation or translation, is possible.

In the depicted embodiment the bottom member 301 is a substantially inverted T-shaped member with a long horizontal leg and an offset short vertical leg. The short leg of the bottom member 301 supports the top equipment holding member 302 while in the transport position as shown in FIG. 11. The short leg is a bearing member that helps transfer the load from the top equipment member 302 into the bottom member 301 and out through the mounting brackets 105, not shown, to the vehicle's roof when the rack is in the transport position. Additionally, in the depicted embodiment the strut 340 that controls the movement from the transport position to the loading position and back is attached to the short leg of the bottom member 301.

The first leg member 303 is shown in its first position, the transport position, in FIG. 11. The bottom of the first leg member 303 is pivotally connected 310 at a fixed point to the bottom member 301. This connection 310 allows the first leg member 303 to rotate about a fixed connection point along the bottom member 301. Additionally, the connection 310 transfers the equipment load forces from the first leg member 303 into the bottom member 301. In the depicted embodiment the connection point 310 comprises of a through-bolt between a fixed point on the first leg member 303 and on the bottom member 301. A spacer is placed between the two members and the through-bolt only allows for rotational movement about the connection axis with no translational movement. It is understood that any type of pivot connection, other then a trough-bolt, can be used for this connection.

The second position for the first leg member 303, shown in FIG. 10, is the loading position. The rack is held in the loading position and away from the side of the vehicle by the first leg member 303 bearing on the end of the second leg member 304 in the loading position. This restriction in angular rotation for the first leg member 303 prevents the sports equipment vehicle rack from contacting the side of the vehicle preventing damage. The first leg member 303 and the second leg member 304 do not cross each other and rotate about a constant, similar plane.

The top of the first leg member 303 is also pivotally connected 311 at a fixed point to the top equipment holding member 302 as shown in FIGS. 10 & 11. This connection 311 allows the first leg member 303 to rotate about a fixed connection point along the top equipment holding member 302. Additionally, the connection 311 transfers the equipment load forces from the top equipment holding member 302 into the first leg member 303. In the depicted embodiment the connection point 311 comprises of a through-bolt between a fixed point on the first leg member 303 and on the top equipment holding member 302. Similar to the other members, in the depicted embodiment the first leg member 303 is constructed out of powder-coated aluminum with a hollow square cross-section shape. It should be understood that a variety of materials and cross-sectional shapes may be used for this member as well as any other members within the sports equipment vehicle rack.

The second leg member 304 is also shown in its first position, the transport position, in FIG. 11. The bottom of the second leg member 304 is pivotally connected 312 at a fixed point to the bottom member 301 on the loading side. This connection 312 allows the second leg member 304 to rotate about a fixed connection point along the bottom member 301. Additionally, the connection 312 transfers the equipment load forces from the second leg member 304 into the bottom member 301. In the depicted embodiment the connection point 312 comprises of a through-bolt between a fixed point on the second leg member 304 and on the bottom member 301.

The top of the second leg member 304 is also pivotally connected 313 at a fixed point on the top equipment holding member 302 as shown in FIGS. 10 & 11. This connection 313 allows the second leg member 304 to rotate about a fixed connection point along the top equipment holding member 302. Additionally, the connection 313 transfers the equipment load forces from top equipment holding member 302 into the second leg member 304. In the depicted embodiment the connection point 313 comprises of a through-bolt between a fixed point on the second leg member 304 and on the top equipment holding member 302.

The second position for the second leg member 304, shown in FIG. 10, is the loading position with the member extending below the vehicle roof height. In the depicted embodiment connection 312 transfers the shear force from the first leg member 303 bearing on the end of the second leg member 304 into the bottom member 301. Similar to the other members, in the depicted embodiment the second leg member 304 is constructed out of powder-coated aluminum with a hollow square cross-section shape. It should be understood that a variety of materials and cross-sectional shapes may be used for this member as well as any other members within the sports equipment vehicle rack.

The top equipment holding member 302 is attached to both the first leg member 303 by connection 311 at a fixed point and the second leg member 304 by connection 313 at a fixed point. In the depicted embodiment the top equipment holding member 302 is a substantially U-shaped member in an upward direction with an adjustable strap 321, not shown, to hold down the paddle-board or other loads. The top equipment holding member 302 has a long horizontal leg and two short vertical legs on both ends. The top equipment holding member 302 has a loading side that supports the load as shown in the loading position of FIG. 10 and an opposite non-loading side. The adjustable strap 321, not shown, attaches to the loading side of the top equipment holding member 302 at a fixed position 322 near the leg of the substantially U-shape member as shown in FIG. 11. The other end of the adjustable strap 321, not shown, attaches to the non-loading side of the top equipment holding member 302 at a plurality of locations 323 determined by the size of the paddle-board or other load. In the transport and loading position the adjustable strap 321, not shown, restricts the movement of the paddle board or other load. In the depicted embodiment the adjustable strap is high strength fabric. It should be appreciated that other forms of securement can be used to hold-down the paddle-board to the rack. Additionally, it should be noted that many other types of sport equipment can attach to the top equipment member. Instead of carrying a paddle-board the rack may carry a kayak, skis, or other sporting equipment.

Similar to the other members, in the depicted embodiment the top equipment holding member 302, is constructed out of powder-coated aluminum with a hollow square cross-section shape. It should be understood that a variety of materials and cross-sectional shapes may be used. Additionally, in other embodiments a protective padding such as rubber or high density foam may be applied to the member to protect the paddle-board 400 during transport.

The rear support section 350 in the depicted embodiment is constructed in a similar way as the front support section 300. It comprises of a bottom member 301, a top equipment holding member 302, a first leg member 303, and a second leg member 304. By constructing the rear support section and the front support section in the same manner the cost of manufacturing the vehicle rack is reduced.

In the transport position shown in FIG. 11, the top equipment holding member 302 is substantially parallel in relation to the bottom member 301. The paddle-board is supported by the top equipment holding member as shown in FIG. 11 with the top equipment holding member 302 bearing directly on the bottom member 301. In the loading position shown in FIG. 10, the top equipment holding member 302 is substantially perpendicular and at an inclined plane in relation to the bottom member 301. The loading side of the top equipment holding member 302 is at a lower elevation then the bottom member 301 and the vehicle roof height. By lowering the elevation for loading a paddle-board 400, users will not have to lift the paddle-board or other sports equipment vertically as high in relation to the final transport height as shown in FIG. 10.

To move both the front support member 300 and the rear support member 350 from the transport position to the loading position an attachable handle arm 360, not shown, is used. The handle arm is a long straight member with a handle that in the depicted embodiment is constructed out of powder-coated aluminum with a hollow circular cross-section shape. It should be understood that a variety of materials and cross-sectional shapes may be used. In the depicted embodiment the non-handle side of the handle arm attaches at a point 330 on the non-loading side of the top equipment holding member 302 at the base of the short leg as shown in FIG. 11. This connection can be made at either the front or rear support member. The user, standing on the non-loading side of the vehicle rack uses the handle arm 360, not shown, to push the rack into the loading position. The handle arm can detach and be stored inside the bottom member 301 during transport or inside of the vehicle. When a paddle-board is attached to the rack both front and rear support members will move together, however, if no load is attached to the rack then each support member will move separately. It is also understood that this handle can also be a telescoping handle to save storage space.

To move both the front support member 300 and the rear support member 350 from the loading position to the transport position a user will stand on the loading side of the vehicle and push-up on the loading side of the top equipment holding member 302. This movement can be performed by the users hands or with the handle arm 360, not shown, at attachment point 331 on the loading side of the top equipment holding member 302. Because the rack is supporting the paddle-board load and a strut 340 is attached, the force required to move the load to the transport position is less than if the rack was not used.

When the rack is moved from the loading position to the transport position and back the first leg member 303 and second leg member 304 act as radius bars for the top equipment holding member 302. The top equipment holding member 302 moves in an arc-like motion always facing substantially upwards and supporting the equipment load.

In other embodiments, not, shown both the front support member and the rear support member are connected so as to move to the loading position together and not separately when equipment is not loaded onto the rack.

To facilitate a constant, smooth motion between the loading position and transport position a strut 340 is mounted on both the front support member 300 and rear support members 350. In the depicted embodiment, shown in FIGS. 10 & 11, the hydraulic strut attaches to the top equipment holding member 302 at a fixed point 314 and to the bottom member 301 at a fixed point 315. When the rack is moved between the transport and loading positions the strut 340 extends and compresses assisting the movement of the rack. As shown in FIG. 10 the strut 340 is shown in its first position while the rack is in its transport position. One end of the strut 340 is pivotally connected 314 to the top equipment holding member 302. This allows the strut 340 to rotate around a fixed point on the top equipment holding member 302. The other end of the strut 340 is pivotally attached at a fixed point 315 to the short leg of the bottom member 301. The strut 340 rotates about a fixed point 315 on the bottom member 301.

FIG. 11 shows the strut 340 in its second position while the rack is in its loading position. In the depicted embodiment the strut 340 is an hydraulic strut similar to the struts found on vehicle tailgate supports. It should be noted that any type of strut can be used with the rack. With the strut being exposed to the elements it is understood that a protective cover may encompass the strut elements.

FIG. 11 additionally depicts a locking mechanism 345 on the vehicle rack. In the depicted embodiment the locking mechanism 345 secures the rack in the transport position. The locking mechanism 345 attaches to the bottom member 301 and extends in an upward direction on both the left and right side of the bottom member 301. The extensions of the locking mechanism 345 have a hole at the top that matches with a hole on the top equipment holding member 302 when the rack is in its transport position. A rod, not shown, is threaded through these holes and a pad lock, not shown, is used to secure the rod in place. It should be appreciated that other forms of locking devices can be used to secure the rack in the transport position. For example, a cylinder lock or magnetic lock may be used to restrict movement of the top equipment member 301.

While a number of exemplary aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations are within their true spirit and scope. Each apparatus embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Whenever a range is given in the specification, all intermediate ranges and subranges, as well as all individual values included in the ranges given are intended to be included in the disclosure. When a Markush group or other grouping is used herein, all individual members of the group and all combinations and subcombinations possible of the group are intended to be individually included in the disclosure.

In general the terms and phrases used herein have their art-recognized meaning, which can be found by reference to standard texts, journal references and contexts known to those skilled in the art. The above definitions are provided to clarify their specific use in the context of the invention.

All patents and publications mentioned in the specification are indicative of the levels of skill of those skilled in the art to which the invention pertains. All references cited herein are hereby incorporated by reference to the extent that there is no inconsistency with the disclosure of this specification. Some references provided herein are incorporated by reference herein to provide details concerning additional starting materials, additional methods of synthesis, additional methods of analysis and additional uses of the invention.

We claim:

1. A sports equipment rack for mounting on a vehicle roof comprising:
   a plurality of support sections;
      each support section comprising;
         a bottom member that attaches to a crossbar mounted on the top of a vehicle with a loading side and a non-loading side, wherein the bottom member is a substantially inverted T-shape that consists of a long horizontal leg and a short vertical leg near the loading side to support the top equipment holding member in the transport position;
         a top equipment holding member that holds an equipment load with a loading and a non-loading side;
         a first leg member with an upper portion and a lower portion;
         a second leg member with an upper portion and a lower portion;
         the lower portion of the first leg member is pivotally connected to the bottom member at a first connection point, the lower portion of the second leg member is pivotally connected to the bottom member at a second connection point, and the first and second connection points are offset;
         the upper portion of the first leg member is pivotally connected to the top equipment holding member at a first connection point, the upper portion of the second leg member is pivotally connected to the top equipment holding member at a second connection point, and the first and second connection points are offset;
      each support section having a transport position;
         wherein the top equipment holding member is bearing on the bottom member located above a roof plane of the vehicle and supporting the equipment load;
         wherein the first leg member and the second leg member in the transport position are substantially parallel to each other;
      each support section having a loading position;
         wherein the top equipment holding member is substantially at an inclined plane and the loading side is partially below the roof plane of the vehicle supporting the equipment load;
         wherein the first leg member and second leg member in the loading position are not substantially parallel to each other;
         wherein the first leg member and second leg member support the top equipment member away from a side of the vehicle;
      wherein the top equipment holding member moves from the transport position to the loading position and back in an arc shaped motion facing substantially upwards in direction from the ground;
      the first leg member and the second leg member act as a radius bar for a movement of the top equipment holding member; and
      each support section further comprising a strut, wherein the strut is pivotally connected to the bottom member at a fixed point and pivotally connected to the top equipment holding member at a fixed point;
      wherein the strut is in line with the bottom member and the top equipment holding member and the strut compresses and extends when the top equipment holding member moves relative to the bottom member from the transport position to the loading position and back supporting the force of a movement of the equipment load.

2. The apparatus in claim 1 further comprising a handle, wherein the handle attaches to a plurality of points on the top equipment holding member for moving the plurality of support sections from the transport position to the loading position and back.

3. The apparatus in claim 2 further comprising a locking mechanism, wherein the locking mechanism is configured to lock the top equipment loading member to the bottom member while in the transport position.

4. The apparatus in claim 3 wherein the first and second connection points on the bottom member and the first and second connection points on the top equipment holding member are fixed connection points.

5. The apparatus in claim 4 wherein the first leg member and second leg member rotate in the same plane as each other and do not cross.

6. The apparatus in claim 5 wherein the top equipment holding member consists of a long horizontal leg and a short vertical leg on both ends.

7. A method for loading sports equipment onto the roof of a vehicle comprising:
   moving a plurality of support sections into a loading position;
      wherein each support section comprises:
         a bottom member that attaches to a crossbar mounted on the top of a vehicle with a loading side and non-loading side, wherein the bottom member is a substantially inverted T-shape that consists of a long horizontal leg and a short vertical leg near the loading side;
         a top equipment holding member that holds an equipment load with a loading and a non-loading side;
         a first leg member with an upper portion and a lower portion; and
         a second leg member with an upper portion and a lower portion;

wherein the lower portion of the first leg member is pivotally connected to the bottom member at a first connection point, the lower portion of the second leg member is pivotally connected to the bottom member at a second connection point, and the first and second connection points are offset, and the upper portion of the first leg member is pivotally connected to the top equipment holding member at a first connection point, the upper portion of the second leg member is pivotally connected to the top equipment holding member at a second connection point, and the first and second connection points are offset;

wherein in the loading position the top equipment holding member is substantially at an inclined plane and the loading side is partially below a roof plane of the vehicle;

wherein the first leg member and second leg member in the loading position are not substantially parallel to each other;

wherein the first leg member and second leg member support the top equipment member away from a side of the vehicle;

loading sports equipment onto the top equipment holding member;

securing the sports equipment onto the top equipment holding member;

moving the plurality of support sections into a transport position;

wherein the top equipment holding member is bearing on the bottom member located above a roof plane of the vehicle and supporting the equipment load;

wherein in the transport position the top equipment holding member is substantially parallel to the bottom member above the roof plane of a vehicle;

wherein the top equipment holding member moves in an arc shaped motion with the first leg member and the second leg member acting as a radius bar for the movement of the top equipment loading member; and each support section further comprising a strut, wherein the strut is pivotally connected to the bottom member at a fixed point and pivotally connected to the top equipment holding member at a fixed point; wherein the strut is in line with the bottom member and the top equipment holding member and the strut compresses and extends when the top equipment holding member moves relative to the bottom member from the transport position to the loading position and back supporting the force of a movement of the equipment load moving the plurality of support sections back into the loading position;

unloading the sports equipment from the top equipment holding member; and moving the plurality of support section into the transport position.

8. The method of claim 7 further comprising, locking the top equipment holding member to the bottom member while in the transport position.

* * * * *